(12) United States Patent
Saito

(10) Patent No.: US 11,500,220 B2
(45) Date of Patent: Nov. 15, 2022

(54) IMAGING LENS AND IMAGING APPARATUS

(71) Applicant: FUJIFILM Corporation, Tokyo (JP)

(72) Inventor: Hiroki Saito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 117 days.

(21) Appl. No.: 16/784,138

(22) Filed: Feb. 6, 2020

(65) Prior Publication Data

US 2020/0257129 A1 Aug. 13, 2020

(30) Foreign Application Priority Data

Feb. 12, 2019 (JP) .............................. JP2019-022760

(51) Int. Cl.
*G02B 27/42* (2006.01)
*G02B 9/10* (2006.01)

(52) U.S. Cl.
CPC ............ *G02B 27/4211* (2013.01); *G02B 9/10* (2013.01); *G02B 27/4216* (2013.01)

(58) Field of Classification Search
CPC ... G02B 27/4211; G02B 27/4216; G02B 9/10
USPC ........................................................ 359/558
See application file for complete search history.

(56) References Cited

U.S. PATENT DOCUMENTS

| 10,168,510 | B2 | 1/2019 | Eguchi | |
|---|---|---|---|---|
| 2011/0310486 | A1* | 12/2011 | Eguchi | G02B 27/4211 359/570 |
| 2018/0120582 | A1 | 5/2018 | Kobayashi | |
| 2018/0373004 | A1 | 12/2018 | Yasui | |

FOREIGN PATENT DOCUMENTS

| JP | 2009-271354 A | 11/2009 |
|---|---|---|
| JP | 2012-002999 A | 1/2012 |
| JP | 2012-123152 A | 6/2012 |
| JP | 2014-089385 A | 5/2014 |
| JP | 2014-109700 A | 6/2014 |
| JP | 2016-080877 A | 5/2016 |
| JP | 2016-218276 A | 12/2016 |
| JP | 2018-072623 A | 5/2018 |
| JP | 2018-087965 A | 6/2018 |
| JP | 2019-008047 A | 1/2019 |

OTHER PUBLICATIONS

An Office Action; "Notice of Reasons for Refusal," mailed by the Japanese Patent Office dated Dec. 21, 2021, which corresponds to Japanese Patent Application No. 2019-022760 and is related to U.S. Appl. No. 16/784,138 with English language translation.

\* cited by examiner

*Primary Examiner* — Marin Pichler
*Assistant Examiner* — Mitchell T Oestreich
(74) *Attorney, Agent, or Firm* — Studebaker & Brackett PC

(57) ABSTRACT

The imaging lens consists of, in order from the object side, a front group, an aperture stop, and a rear group. The front group includes a diffractive optical element having a positive lens and a negative lens in order from the object side. A diffractive surface is provided between an object side surface of the positive lens and an image side surface of the negative lens. Assuming that a distance on an optical axis from the diffractive surface to the aperture stop in a state in which an object at infinity is in focus is Ddoe, and a focal length of the whole system in a state in which the object at infinity is in focus is f, the imaging lens satisfies Conditional Expression (1): $0.02<\text{Ddoe}/f<0.11$.

15 Claims, 13 Drawing Sheets

EXAMPLE 1

EXAMPLE 1

EXAMPLE 4

EXAMPLE 2

FIG. 11
EXAMPLE 1
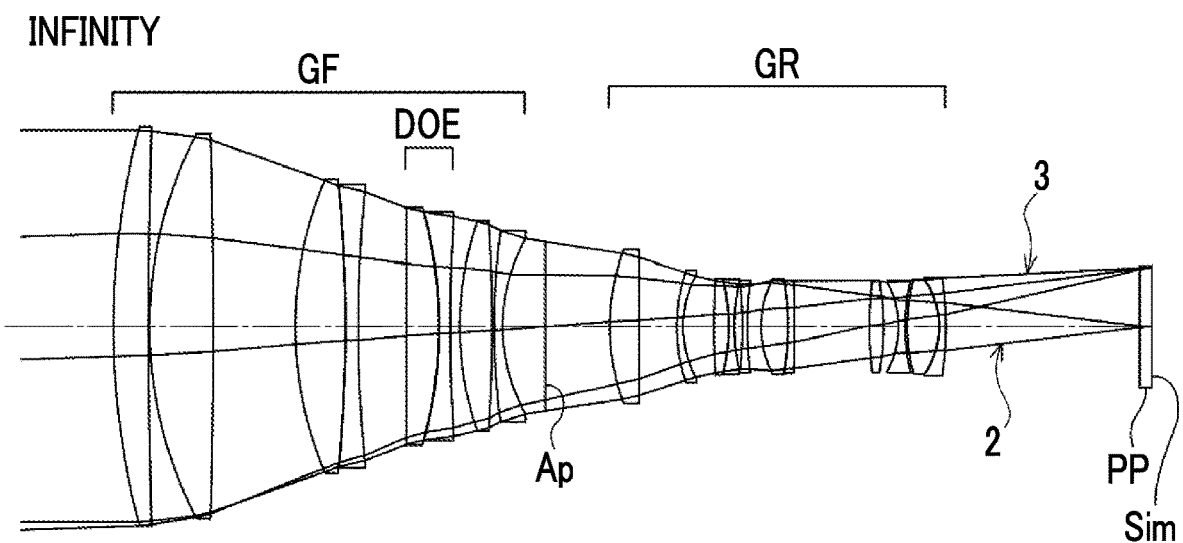
INFINITY
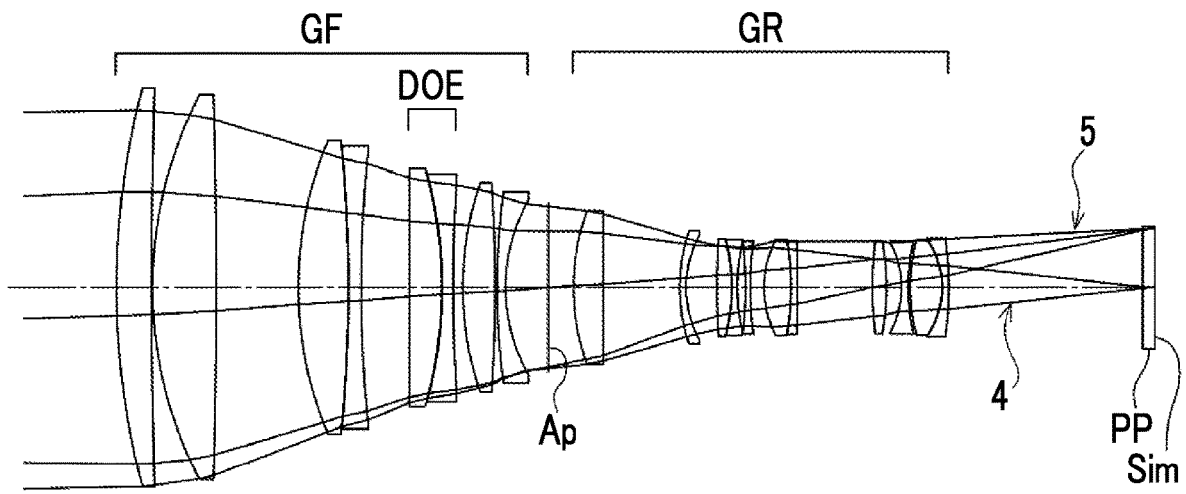
CLOSEST

IMAGING LENS AND IMAGING APPARATUS

CROSS-REFERENCE TO RELATED APPLICATIONS

The present application claims priority under 35 U.S.C. § 119 to Japanese Patent Application No. 2019-022760, filed on Feb. 12, 2019. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

In the related art, as imaging lenses applicable to imaging apparatuses such as a digital camera, imaging lenses described in JP2012-002999A, JP2018-072623A, and JP2018-087965A have been proposed. These documents each describe an optical system comprising a diffractive optical element.

SUMMARY OF THE INVENTION

As the focal length of the imaging lens increases, the optical system tends to increase in size and weight. In particular, an imaging lens having a long focal length has a strong tendency. Therefore, in a case where it is intended to further reduce the size and weight, chromatic aberration and spherical aberration occur, and it is difficult to ensure performance In the optical systems described in JP2012-002999A, JP2018-072623A, and JP2018-087965A, the difference in height between the principal rays of the on-axis ray and the off-axis ray on the diffractive surface of the diffractive optical element is relatively large. Therefore, it is difficult to satisfactorily correct both longitudinal chromatic aberration and lateral chromatic aberration in a case where it is intended to achieve reduction in size.

The present disclosure has been made in view of the above situations, and an object thereof is to provide an imaging lens that is reduced in size and weight while suppressing chromatic aberration and spherical aberration, and an imaging apparatus comprising the imaging lens.

According to an aspect of the present disclosure, there is provided an imaging lens consisting of, in order from an object side: a front group; an aperture stop; and a rear group. The front group includes a diffractive optical element having a positive lens and a negative lens in order from the object side. A diffractive surface is provided between an object side surface of the positive lens and an image side surface of the negative lens. In addition, it is preferable that assuming that a distance on an optical axis from the diffractive surface to the aperture stop in a state in which an object at infinity is in focus is Ddoe, and a focal length of the imaging lens in a state in which the object at infinity is in focus is f, Conditional Expression (1) is satisfied.

$$0.02 < Ddoe/f < 0.11 \tag{1}$$

It is more preferable that the imaging lens of the aspect satisfies Conditional Expression (1-1).

$$0.05 < Ddoe/f < 0.09 \tag{1-1}$$

In the imaging lens of the above aspect, it is preferable that the front group includes at least one positive lens closer to the object side than the diffractive optical element. In addition, assuming that an Abbe number of the at least one positive lens based on a d line is vp, it is preferable that the imaging lens includes at least one positive lens that is closer to the object side than the diffractive optical element and satisfies Conditional Expression (2), and it is more preferable that the imaging lens includes at least one positive lens that is closer to the object side than the diffractive optical element and satisfies Conditional Expression (2-1).

$$20 < vp < 65 \tag{2}$$

$$40 < vp < 55 \tag{2-1}$$

In the imaging lens of the above aspect, assuming that a radius of curvature of the object side surface of the positive lens closest to the object side in the diffractive optical element is Rp1, and a radius of curvature of an image side surface of the positive lens closest to the object side in the diffractive optical element is Rp2, it is preferable to satisfy Conditional Expression (3), and it is more preferable to satisfy Conditional Expression (3-1).

$$0.7 < (Rp1+Rp2)/(Rp1-Rp2) < 5 \tag{3}$$

$$0.9 < (Rp1+Rp2)/(Rp1-Rp2) < 3 \tag{3-1}$$

In the imaging lens of the above aspect, it is preferable that the front group has a positive refractive power. In addition, it is preferable that the rear group includes a focusing lens group which moves along the optical axis during focusing and has a positive refractive power. It is preferable that the focusing lens group consists of one positive lens. In addition, it is preferable that the rear group includes a vibration reduction lens group which moves in a direction that intersects with the optical axis during image blur correction, at a position closer to an image side than the focusing lens group.

In the imaging lens of the above aspect, it is preferable that the front group consists of, in order from the object side, a first partial group and a second partial group which is separated from the first partial group by a longest air distance on the optical axis in the front group. In addition, it is preferable that the diffractive optical element is disposed in the second partial group. It is preferable that the first partial group consists of two positive lenses.

In the imaging lens of the above aspect, it is preferable that an Abbe number of the positive lens closest to the object side in the diffractive optical element based on a d line is greater than an Abbe number of the negative lens closest to an image side in the diffractive optical element based on the d line.

In the imaging lens of the above aspect, it is preferable that the diffractive optical element has, in order from the object side, a first resin member and a second resin member, which is cemented with the first resin member and of which a refractive index is different from that of the first resin member, between the positive lens and the negative lens arranged in order from the object side. In addition, it is preferable that the diffractive surface is provided on a cemented surface between the first resin member and the second resin member. In this configuration, assuming that a partial dispersion ratio of the first resin member between a g line and an F line is θgF1, and a partial dispersion ratio of the second resin member between the g line and the F line is θgF2, it is preferable to satisfy Conditional Expression (4), and it is more preferable to satisfy Conditional Expression (4-1).

$$0.08 < \theta gF2 - \theta gF1 < 0.3 \quad (4)$$

$$0.13 < \theta gF2 - \theta gF1 < 0.2 \quad (4\text{-}1)$$

An imaging apparatus according to another aspect of the present disclosure comprises the imaging lens according to the above aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "having ~ and ~ in order from the object side" includes all of "having components in a continuous order" and "having components in a discontinuous order". The term "~ group having a positive refractive power" means that the group has a positive refractive power as a whole. The term "a lens having a positive refractive power" and the term "a positive lens" are synonymous. The term "a lens having a negative refractive power" and the term "negative lens" are synonymous. The "~ lens group" is not limited to a configuration using a plurality of lenses, but may consist of only one lens. The "single lens" means one uncemented lens.

Unless otherwise specified, the sign of refractive power, the surface shape, and the radius of curvature of a lens including an aspheric surface are considered in terms of the paraxial region. Regarding the sign of the radius of curvature, the sign of the radius of curvature of the surface convex toward the object side is positive and the sign of the radius of curvature of the surface convex toward the image side is negative.

The "focal length" used in a conditional expression is a paraxial focal length. The values used in Conditional Expressions are values in a case where the d line is used as a reference in a state where the object at infinity is in focus unless otherwise specified. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers). The partial dispersion ratio θgF between the g line and the F line of a certain lens is defined by θgF=(Ng-NF)/(NF-NC), where Ng, NF, and NC are the refractive indices of the lens at the g line, the F line, and the C line.

According to the present disclosure, it is possible to provide an imaging lens that is reduced in size and weight while suppressing chromatic aberration and spherical aberration, and an imaging apparatus comprising the imaging lens.

BRIEF DESCRIPTION OF THE DRAWINGS

FIG. 11 is a diagram showing a configuration and rays of the imaging lens according to Example 1 of the present disclosure.

DESCRIPTION OF THE PREFERRED EMBODIMENTS

Figure 1:
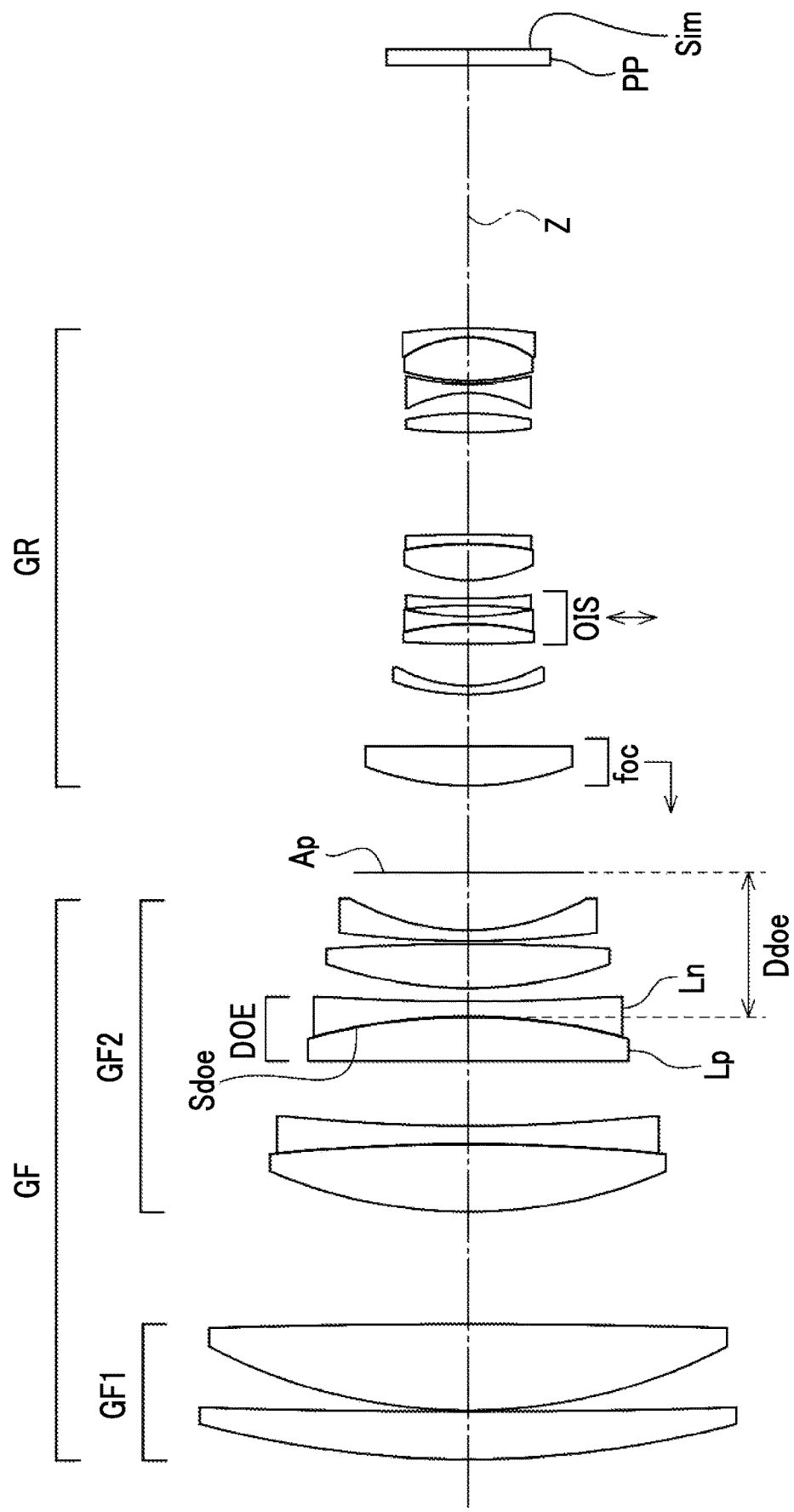
FIG. 1 is a cross-sectional view showing a configuration and rays of an imaging lens according to an embodiment of the present disclosure corresponding to the imaging lens of Example 1 of the present disclosure.

Hereinafter, embodiments of the present disclosure will be described in detail with reference to the accompanying drawings. FIG. 1 shows a configuration of an imaging lens according to an embodiment of the present disclosure. FIG. 11 shows a configuration and rays of the imaging lens shown in FIG. 1. In FIG. 11, the upper part labeled "INFINITY" shows a state where the object at infinity is in focus, and the lower part labeled "CLOSEST" shows a state where the closest object is in focus. The on-axis rays 2 and 4 and the rays with the maximum angle of view 3 and 5 in the states are shown. The examples shown in FIGS. 1 and 11 correspond to the imaging lens of Example 1 to be described later. In FIGS. 1 to 11, the left side is the object side, and the right side is the image side. Hereinafter, description will be given mainly with reference to FIG. 1.

FIG. 1 shows an example in which, assuming that an imaging lens is applied to an imaging apparatus, an optical member PP having a parallel plate shape is disposed on the image side of the imaging lens. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens of the present disclosure consists of a front group GF, an aperture stop Ap, and a rear group GR in order from the object side along the optical axis Z. The front group GF consists of a first partial group GF1 and a second partial group GF2 in order from the object side. The first partial group GF1 and the second partial group GF2 are separated by the longest air distance on the optical axis in the front group GF. It should be noted that the aperture stop Ap shown in FIG. 1 does not indicate a shape thereof, but indicates a position thereof on the optical axis.

The front group GF includes a diffractive optical element DOE having a diffractive surface Sdoe. The diffractive surface Sdoe is a diffractive optical surface provided with a diffraction grating having a diffractive function. The diffractive optical element DOE of the imaging lens of the present disclosure has a positive lens and a negative lens in order from the object side, and the diffractive surface Sdoe is provided between the object side surface of the positive lens and the image side surface of the negative lens. The front group GF includes elements having a positive lens and a negative lens in order from the object side. Thereby, there is an advantage in correcting spherical aberration and longitudinal chromatic aberration. Further, providing the diffractive surface Sdoe at the above position is advantageous in correcting longitudinal chromatic aberration.

The diffractive optical element DOE may have a configuration in which, for example, a positive lens and a negative lens are cemented and a diffractive surface Sdoe is provided on the cemented surface. Alternatively, the diffractive optical element DOE has a configuration in which one resin member or a plurality of laminated resin members is provided between the positive lens and the negative lens and a diffractive surface Sdoe is provided on the surface of the resin member and/or the lens surface.

Figure 12:
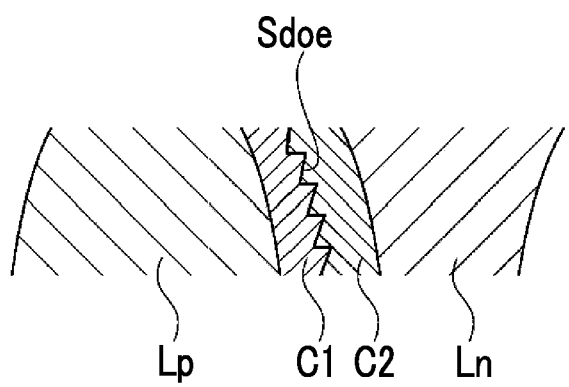
FIG. 12 is a conceptual diagram for explaining an example of a diffractive optical element.

As an example, FIG. 12 shows an enlarged conceptual diagram of a part of a diffractive optical element DOE having a resin member. The diffractive optical element DOE of the example shown in FIG. 12 is configured by cementing a positive lens Lp, a first resin member C1, a second resin member C2, and a negative lens Ln in order from the object side. The diffractive surface Sdoe is provided on the cemented surface between the first resin member C1 and the second resin member C2. The first resin member C1 and the second resin member C2 are made of materials having different refractive indices. FIG. 12 schematically shows the shape of the diffractive surface Sdoe, the shape of each lens, and the shape of each resin member.

It should be noted that the diffractive optical element DOE may have a configuration in which an air distance is provided inside and a diffractive surface Sdoe is provided on an air contact surface of a lens or a resin member. However, the configuration in which the diffractive surface Sdoe is provided on the cemented surface is more advantageous in that occurrence of ghosts and flares on the diffractive surface Sdoe is suppressed as compared with the configuration in which the diffractive surface Sdoe is provided on the air contact surface.

In the example shown in FIG. 1, the cemented lens which is second from the object side in the second partial group GF2 corresponds to the diffractive optical element DOE. The positive lens Lp is disposed to be closest to the object side in the diffractive optical element DOE. The negative lens Ln is disposed to be closest to the image side in the diffractive optical element DOE. The diffractive surface Sdoe is provided between the positive lens Lp and the negative lens Ln.

Assuming that a focal length of the whole system is f and a distance on the optical axis from the diffractive surface Sdoe to the aperture stop Ap is Ddoe in the state in which the object at infinity is in focus, a diffractive surface Sdoe in the imaging lens of the present disclosure is disposed at a position where Conditional Expression (1) is satisfied. By not allowing the result of Conditional Expression (1) to be equal to or less than the lower limit, it is possible to prevent the diameter of rays passing through the diffractive surface Sdoe from becoming excessively small. Thus, even in a case where a sufficient refractive power for correcting longitudinal chromatic aberration is provided to the diffractive surface Sdoe, it is possible to suppress occurrence of spherical aberration. By not allowing the result of Conditional Expression (1) to be equal to or greater than the upper limit, it is possible to prevent the difference between the heights of the axial principal ray and the off-axis principal ray passing through the diffractive surface Sdoe from becoming excessively large. Thus, it becomes easy to correct satisfactorily chromatic aberration well while balancing longitudinal chromatic aberration and lateral chromatic aberration. Specifically, for example, by not allowing the result of Conditional Expression (1) to be equal to or greater than the upper limit, it becomes easy to satisfactorily correct longitudinal chromatic aberration without having great effect on lateral chromatic aberration. Further, by not allowing the result of Conditional Expression (1) to be equal to or greater than the upper limit, there is an advantage in suppressing the increase in diameter and the increase in weight of the diffractive optical element DOE. In addition, in a case of a configuration in which Conditional Expression (1-1) is satisfied, it is possible to obtain more favorable characteristics.

$$0.02 < Ddoe/f < 0.11 \tag{1}$$

$$0.05 < Ddoe/f < 0.09 \tag{1-1}$$

In general, in a case where an imaging lens is intended to be reduced in size and weight, longitudinal chromatic aberration and spherical aberration increase. In particular, such a tendency is strong in an imaging lens having a long focal length. In a case where a lens is added to correct the increased longitudinal chromatic aberration and spherical aberration, the size of the optical system increases and the weight thereof also increases. Therefore, in the imaging lens of the present disclosure, the front group GF comprises a diffractive optical element DOE having a positive lens and a negative lens in order from the object side, thereby correcting spherical aberration. Since the diffractive optical element DOE is disposed to satisfy Conditional Expression (1), chromatic aberration is satisfactorily corrected, and the optical system is reduced in size and weight while these aberrations are suppressed.

Regarding the position of the diffractive optical element DOE in the front group GF, it is preferable that the diffractive optical element DOE is disposed in the second partial group GF2. Since the diffractive optical element DOE is disposed in the image side partial group in the front group GF, it is possible to prevent undesirable light incident from the object side from reaching the diffractive surface Sdoe. This is advantageous in suppressing occurrence of ghosts and flares on the diffractive surface Sdoe.

It is preferable that the front group GF includes at least one positive lens closer to the object side than the diffractive optical element DOE. In such a case, it becomes easy to make the incident ray to the diffractive optical element DOE into convergent light. As a result, there is an advantage in reducing the size and weight of the diffractive optical element DOE.

In the configuration in which the front group GF includes at least one positive lens closer to the object side than the diffractive optical element DOE, assuming that an Abbe number of the at least one positive lens closer to the object side than the diffractive optical element DOE based on the d line is vp, it is preferable that the imaging lens includes at least one positive lens that is closer to the object side than the diffractive optical element DOE and satisfies Conditional Expression (2). By not allowing the result of Conditional Expression (2) to be equal to or less than the lower limit, it is possible to prevent secondary spectrum of longitudinal chromatic aberration from being excessively corrected. By not allowing the result of Conditional Expression (2) to be equal to or greater than the upper limit, it becomes easy to correct secondary spectrum of longitudinal chromatic aberration. In a case where the imaging lens includes at least one positive lens that satisfies Conditional Expression (2-1) closer to the object side than the diffractive optical element DOE, it is possible to obtain more favorable characteristics.

$$20<\nu p<65 \tag{2}$$

$$40<\nu p<55 \tag{2-1}$$

It is preferable that the first partial group GF1 consists of two positive lenses. In such a case, since the first partial group GF1 is able to have a positive refractive power while suppressing the enlargement of the lens, the diameter of rays passing through the diffractive surface Sdoe can be reduced. As a result, there is an advantage in reducing the size and weight. For example, the first partial group GF1 in the example shown in FIG. 1 consists of two single lenses each of which has a positive refractive power and is convex toward the object side.

It is preferable that the Abbe number of the positive lens closest to the object side in the diffractive optical element DOE based on the d line is greater than the Abbe number of the negative lens closest to the image side in the diffractive optical element DOE based on the d line. In such a case, there is an advantage in correcting longitudinal chromatic aberration.

Assuming that a radius of curvature of the object side surface of the positive lens closest to the object side in the diffractive optical element DOE is Rp1, and a radius of curvature of an image side surface of the positive lens closest to the object side in the diffractive optical element DOE is Rp2, it is preferable to satisfy Conditional Expression (3). By not allowing the result of Conditional Expression (3) to be equal to or less than the lower limit, it is possible to prevent spherical aberration from being excessively corrected. By not allowing the result of Conditional Expression (3) to be equal to or greater than the upper limit, it is possible to prevent spherical aberration from being insufficiently corrected. In a case where Conditional Expression (3) is not satisfied and spherical aberration is excessively or insufficiently corrected, in order to compensate for the correction through the diffractive surface Sdoe, the difference in spherical aberration depending on wavelength increases. In addition, in a case of a configuration in which Conditional Expression (3-1) is satisfied, it is possible to obtain more favorable characteristics.

$$0.7<(Rp1+Rp2)/(Rp1-Rp2)<5 \tag{3}$$

$$0.9<(Rp1+Rp2)/(Rp1-Rp2)<3 \tag{3-1}$$

In a case where the diffractive optical element DOE includes two kinds of resin members having different refractive indices between the positive lens and the negative lens, the two kinds of resin members are cemented to each other, and the diffractive surface Sdoe is configured to be provided on the cemented surface. In such a case, the diffraction efficiency at each wavelength can be increased by appropriately setting the refractive index of each resin member. For these two kinds of resin members, assuming that a partial dispersion ratio of the resin member on the object side of the diffractive surface Sdoe between the g line and the F line is $\theta gF1$ and a partial dispersion ratio of the resin member on the image side of the diffractive surface Sdoe between the g line and the F line is $\theta gF2$, it is preferable to satisfy Conditional Expression (4). By satisfying Conditional Expression (4), it becomes easy to realize high diffraction efficiency up to a shorter wavelength region. In addition, in a case of a configuration in which Conditional Expression (4-1) is satisfied, it is possible to obtain more favorable characteristics.

$$0.08<\theta gF2-\theta gF1<0.3 \tag{4}$$

$$0.13<\theta gF2-\theta gF1<0.2 \tag{4-1}$$

In the imaging lens according to the present disclosure, it is preferable that the front group GF has a positive refractive power and the rear group GR has a focusing lens group foc that moves along the optical axis Z during focusing and has a positive refractive power. In a case where the imaging lens includes the focusing lens group foc, it is preferable that the rear group GR includes a vibration reduction lens group OIS that moves in a direction that intersects with the optical axis Z during image blur correction, at a position closer to the image side than the focusing lens group foc.

The front group GF having a positive refractive power is able to reduce the diameter of rays incident on the focusing lens group foc. As a result, there is an advantage in reducing the size and weight of the focusing lens group foc. Further, by making the sign of the refractive power of the focusing lens group foc positive, it becomes easy to reduce the beam diameter at a position closer to the image side than the focusing lens group foc. As a result, there is an advantage in reducing the weight of the imaging lens. Furthermore, since the vibration reduction lens group OIS is disposed to be closer to the image side than the focusing lens group foc having a positive refractive power, the vibration reduction lens group OIS can be easily reduced in size and weight.

The focusing lens group foc may be configured to consist of one positive lens. In such a case, there is an advantage in reducing the weight of the focusing lens group foc. As an example, the focusing lens group foc of the example shown in FIG. 1 consists of one positive lens that is disposed to be closest to the object side in the rear group GR and convex toward the object side, and moves to the object side during focusing from the object at infinity to the closest object. In the example shown in FIG. 1, the other lenses remain stationary with respect to the image plane Sim during focusing.

In the example shown in FIG. 1, the vibration reduction lens group OIS consists of three lenses which are third, fourth, and fifth from the object side in the rear group GR, and moves in a direction perpendicular to the optical axis Z during image blur correction. In the example shown in FIG. 1, the other lenses remain stationary with respect to the image plane Sim during image blur correction.

The above-mentioned preferred configurations and available configurations including the configurations relating to the conditional expressions may be any combination, and it is preferable to selectively adopt the configurations in accordance with required specification. According to the imaging lens of the present disclosure, it is possible to reduce the size and weight while suppressing chromatic aberration and spherical aberration. For example, in a case where the imaging lens of the present disclosure is applied to a telephoto lens having a total angle of view of 10 degrees or less, a remarkable effect can be obtained.

Next, numerical examples of the imaging lens of the present disclosure will be described.

EXAMPLE 1

FIG. 1 shows a cross-sectional view showing the configuration of the imaging lens of Example 1, and the illustration method and the configuration thereof are as described above. Therefore, the repeated description is partially omitted here. The imaging lens of Example 1 consists of a front group GF, an aperture stop Ap, and a rear group GR in order from the object side. The front group GF consists of a first partial group GF1 and a second partial group GF2 in order from the object side. The first partial group GF1 consists of two single lenses having a positive refractive power. The cemented lens which is second from the object side of the second partial group GF2 corresponds to the diffractive optical element DOE. The diffractive optical element DOE is configured by cementing, in order from the object side, a positive lens, two kinds of resin members, and a negative lens. The diffractive surface Sdoe is provided on the cemented surface of the two kinds of resin members. The focusing lens group foc consists of one positive lens disposed to be closest to the object side in the rear group GR. The vibration reduction lens group OIS consists of three lenses arranged to be third, fourth, and fifth from the object side in the rear group GR. The outline of the imaging lens of Example 1 has been described above.

Regarding the imaging lens of Example 1, Table 1 shows basic lens data thereof, Table 2 shows data about specification thereof, Table 3 shows variable surface distances thereof, and Table 4 shows phase difference coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, the column of νd shows an Abbe number of each constituent element at the d line, and the column of θgF shows a partial dispersion ratio of each constituent element between the g line and the F line.

In Table 1, the sign of the radius of curvature of the surface convex toward the object side is positive and the sign of the radius of curvature of the surface convex toward the image side is negative. Table 1 also shows the aperture stop Ap and the optical member PP. In a place of a surface number of a surface corresponding to the aperture stop Ap, the surface number and a term of (Ap) are noted. In a place of a surface number of a surface corresponding to the diffractive surface Sdoe, the surface number and a term of (Sdoe) are noted. In Table 1, the variable surface distances, which are distances variable during focusing, are referenced by the reference signs DD[ ], and are written into places of D, where object side surface numbers of distances are noted in[ ].

Table 2 shows the focal length f of the imaging lens in a case where the object at infinity is in focus and the focal length fnear of the imaging lens in a case where the closest object is in focus. Further, Table 2 shows the values of the F number FNo. and the maximum total angle of view 2ω of the imaging lens. (°) in the place of 2ω indicates that the unit thereof is a degree.

Table 3 shows values of the variable surface distances of the imaging lens in a state in which the object at infinity is in focus and a state in which the closest object is in focus. In Tables 2 and 3, the column labeled "Infinity" shows the values in the state in which the object at infinity is in focus, and the column labeled "Closest" shows the values in the state in which the closest object is in focus. The object distance of the closest object in the data of the imaging lens of Example 1 is 2954.6 mm (millimeter). The object distance is a distance on the optical axis from the object to the lens surface closest to the object side.

The shape of the diffractive surface Sdoe is defined by the phase difference function Φ(h) in Conditional Expression (5). Table 4 shows the surface numbers of the diffractive surface Sdoe and the phase difference coefficients of the diffractive surface Sdoe. The "E-n" (n: an integer) in the phase difference coefficients of Table 4 indicates "×10$^{-n}$".

$$101(h)=A2 \times h^2 + A4 \times h^4 + A6 \times h^6 + A8 \times h^8 + A10 \times h^{10} \tag{5}$$

Here, A2, A4, A6, A8, and A10 are phase difference coefficients, and h is a height from the optical axis.

The data in the examples are based on the d line unless otherwise specified. In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

Example 1 Basic Lens Data

| Sn | R | D | Nd | νd | θgF |
|---|---|---|---|---|---|
| 1 | 191.0368 | 8.2962 | 1.54814 | 45.82 | 0.57004 |
| 2 | 1627.3055 | 0.1998 | | | |
| 3 | 101.9256 | 15.0593 | 1.43700 | 95.10 | 0.53364 |
| 4 | −1711.8791 | 19.5279 | | | |
| 5 | 92.2823 | 11.8247 | 1.43700 | 95.10 | 0.53364 |
| 6 | −363.4735 | 2.9962 | 1.91082 | 35.25 | 0.58224 |
| 7 | 319.4118 | 11.3507 | | | |
| 8 | ∞ | 7.7380 | 1.48749 | 70.44 | 0.53062 |
| 9 | −106.3847 | 0.0010 | 1.53458 | 18.91 | 0.38608 |
| 10(Sdoe) | −106.3847 | 0.0590 | 1.59952 | 45.78 | 0.54376 |
| 11 | −106.3847 | 2.5999 | 1.83481 | 42.74 | 0.56490 |
| 12 | 430.9608 | 2.2753 | | | |
| 13 | 79.0465 | 7.6476 | 1.64769 | 33.84 | 0.59227 |
| 14 | −369.0631 | 0.5002 | | | |
| 15 | 182.0811 | 1.9499 | 1.85151 | 40.73 | 0.56930 |
| 16 | 43.5216 | 10.0579 | | | |
| 17(Ap) | ∞ | DD[17] | | | |
| 18 | 53.3375 | 6.8761 | 1.48749 | 70.44 | 0.53062 |
| 19 | 28283.2083 | DD[19] | | | |
| 20 | 43.0217 | 1.5001 | 1.59349 | 67.33 | 0.53667 |
| 21 | 27.2486 | 7.2958 | | | |
| 22 | 183.2830 | 3.4684 | 1.85478 | 24.80 | 0.61232 |
| 23 | −47.2210 | 1.3099 | 1.85151 | 40.73 | 0.56930 |
| 24 | 51.3963 | 1.9305 | | | |
| 25 | −105.0974 | 1.2000 | 1.88300 | 39.22 | 0.57295 |
| 26 | 100.9046 | 3.1998 | | | |
| 27 | 25.8576 | 6.3548 | 1.54814 | 45.82 | 0.57004 |
| 28 | −64.1535 | 1.5800 | 1.95906 | 17.47 | 0.65993 |
| 29 | −298.4015 | 17.8307 | | | |
| 30 | 97.4430 | 3.3055 | 1.61340 | 44.27 | 0.56340 |
| 31 | −59.4710 | 3.4863 | | | |
| 32 | −23.9344 | 1.6001 | 1.59282 | 68.62 | 0.54414 |
| 33 | 49.8587 | 0.4999 | | | |
| 34 | 44.8263 | 7.5554 | 1.73800 | 32.33 | 0.59005 |
| 35 | −20.5509 | 1.5498 | 1.91083 | 35.26 | 0.58293 |
| 36 | −92.0840 | 45.8225 | | | |
| 37 | ∞ | 2.8500 | 1.51680 | 64.20 | 0.53430 |
| 38 | ∞ | 0.0000 | | | |

TABLE 2

Example 1 Specification

| | Infinity | Closest |
|---|---|---|
| f | 388.19 | — |
| fnear | — | 277.13 |
| FNo. | 4.11 | 4.54 |
| 2ω(°) | 4.4 | 4.0 |

TABLE 3

Example 1 Variable Surface Distance

| | Infinity | Closest |
|---|---|---|
| DD[17] | 15.17 | 6.05 |
| DD[19] | 8.97 | 18.08 |

TABLE 4

Example 1 Phase Difference Coefficient Tenth Surface

| A2 | −5.56905E−01 |
|---|---|
| A4 | 2.66319E−04 |
| A6 | −2.32162E−07 |
| A8 | 7.39053E−11 |
| A10 | −1.56226E−15 |

Figure 6:
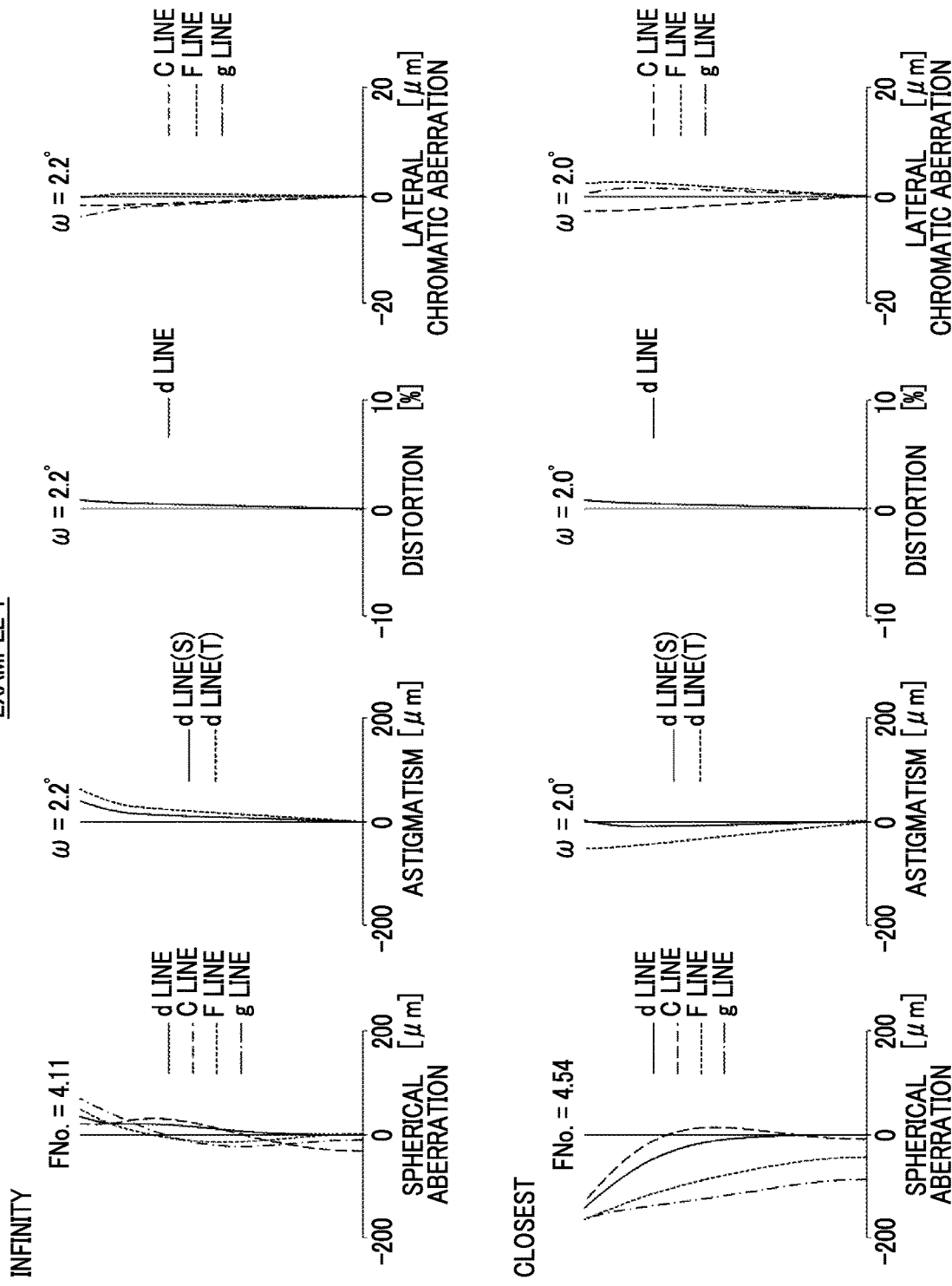
FIG. 6 is a diagram of aberrations of the imaging lens of Example 1 of the present disclosure.

FIG. 6 shows a diagram of aberrations of the imaging lens of Example 1. In FIG. 6, in order from the left side, spherical aberration, astigmatism, distortion, and lateral chromatic aberration are shown. In FIG. 6, the upper part labeled "INFINITY" shows aberration diagrams in a state in which the object at infinity is in focus, and the lower part labeled "CLOSEST" shows aberration diagrams in a state in which the closest object is in focus. In the spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration, aberrations at the C line, the F line, and the g line are respectively indicated by the long dashed line, the short dashed line, and the chain line. In the spherical aberration diagram, FNo. indicates an F number. In the other aberration diagrams, ω indicates a half angle of view.

Symbols, meanings, description methods, and illustration methods of the respective data pieces according to Example 1 are the same as those in the following examples unless otherwise noted. Therefore, in the following description, repeated description will be omitted.

EXAMPLE 2

Figure 2:
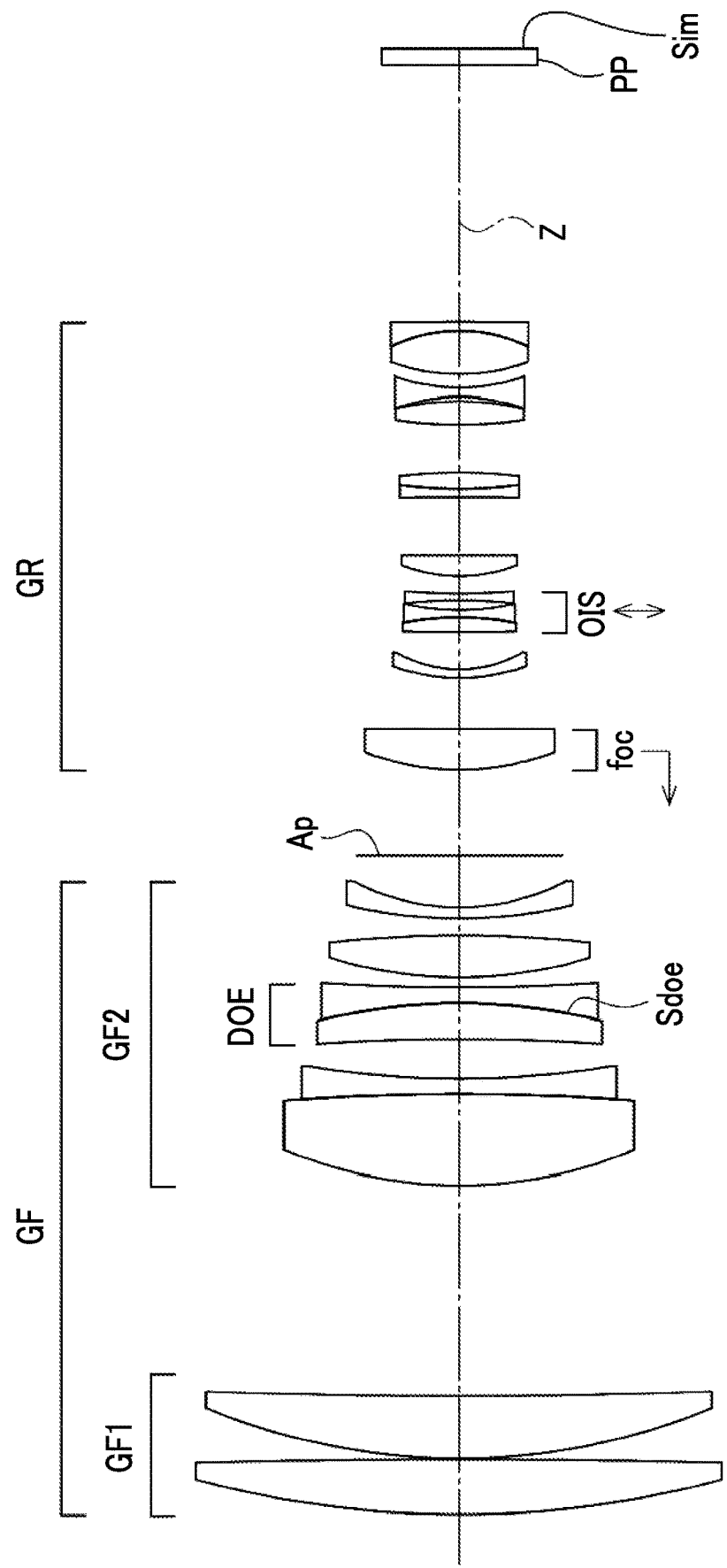
FIG. 2 is a cross-sectional view showing a configuration and rays of the imaging lens according to Example 2 of the present disclosure.
Figure 7:
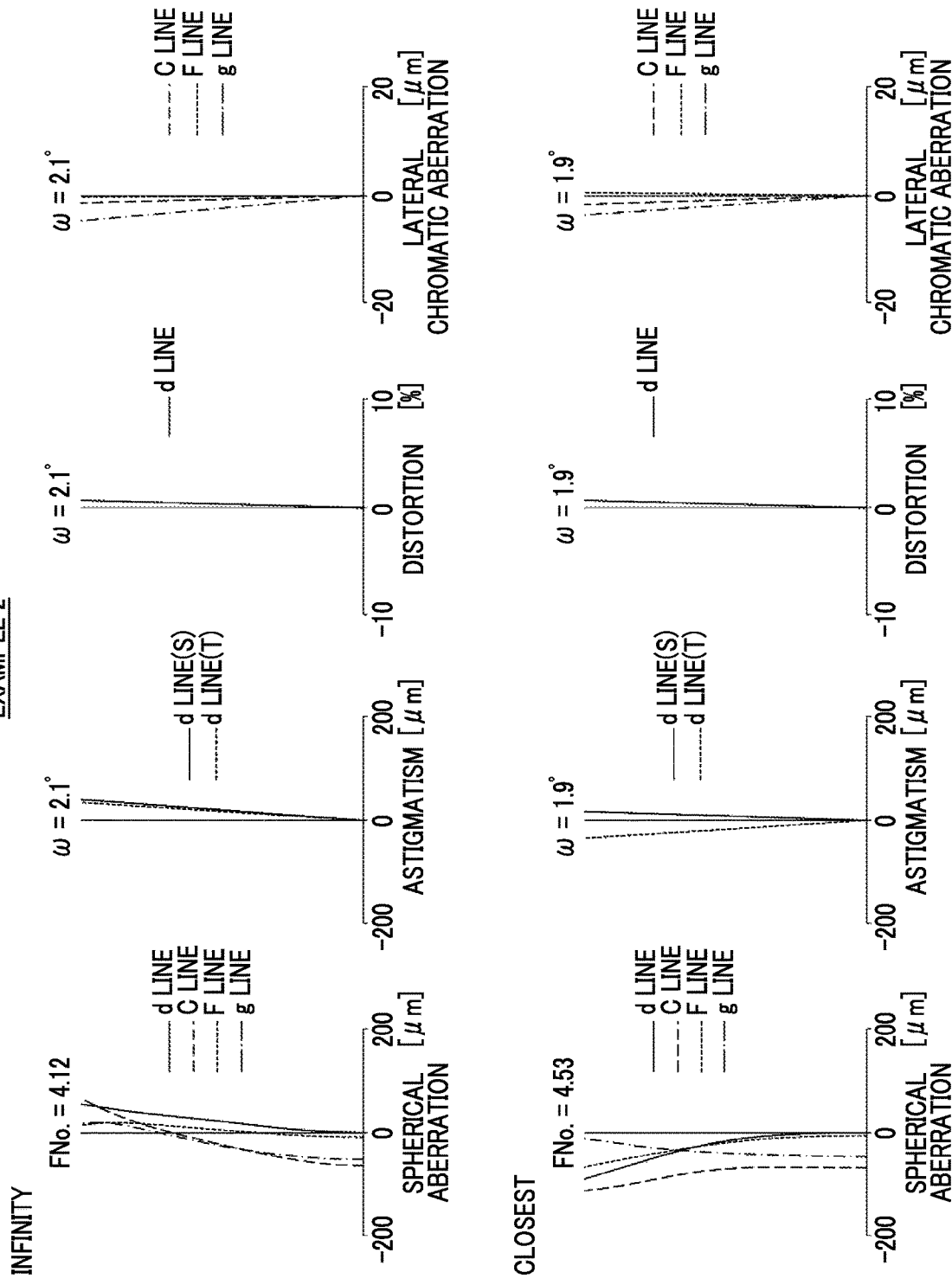
FIG. 7 is a diagram of aberrations of the imaging lens of Example 2 of the present disclosure.

FIG. 2 is a cross-sectional view showing a configuration of the imaging lens of Example 2. The imaging lens of Example 2 has the same configuration as the outline of the imaging lens of Example 1. Regarding the imaging lens of Example 2, Table 5 shows basic lens data thereof, Table 6 shows data about specification thereof, Table 7 shows variable surface distances thereof, Table 8 shows phase difference coefficients thereof, and FIG. 7 shows aberration diagrams. In FIG. 7, the upper part shows aberration diagrams in a state in which the object at infinity is in focus, and the lower part shows aberration diagrams in a state in which the closest object is in focus. The object distance of the closest object in the data of the imaging lens of Example 2 is 2939.7 mm (millimeter).

TABLE 5

Example 2 Basic Lens Data

| Sn | R | D | Nd | vd | θgF |
|---|---|---|---|---|---|
| 1 | 190.3705 | 9.7402 | 1.51742 | 52.15 | 0.55896 |
| 2 | −2050.0042 | 0.1999 | | | |
| 3 | 123.3379 | 11.1080 | 1.43700 | 95.10 | 0.53364 |
| 4 | 1309.0104 | 37.3806 | | | |
| 5 | 84.8384 | 16.1970 | 1.43700 | 95.10 | 0.53364 |
| 6 | −440.0998 | 2.7198 | 1.83481 | 42.74 | 0.56490 |
| 7 | 177.5069 | 6.9896 | | | |
| 8 | −439.7227 | 6.4175 | 1.48749 | 70.44 | 0.53062 |
| 9 | −106.3871 | 0.0010 | 1.53458 | 18.91 | 0.38608 |
| 10(Sdoe) | −106.3871 | 0.0590 | 1.59952 | 45.78 | 0.54376 |
| 11 | −106.3871 | 2.7000 | 1.77250 | 49.60 | 0.55212 |
| 12 | 402.8182 | 1.8000 | | | |
| 13 | 82.5980 | 7.4649 | 1.49700 | 81.61 | 0.53887 |
| 14 | −220.1934 | 3.0512 | | | |
| 15 | 91.9595 | 1.9498 | 1.85151 | 40.73 | 0.56930 |
| 16 | 42.7538 | 9.2914 | | | |
| 17(Ap) | ∞ | DD[17] | | | |
| 18 | 50.8417 | 7.2590 | 1.51742 | 52.19 | 0.55915 |
| 19 | ∞ | DD[19] | | | |
| 20 | 37.5859 | 1.4998 | 1.51742 | 52.19 | 0.55915 |
| 21 | 23.8842 | 6.6156 | | | |
| 22 | 285.2543 | 2.6449 | 1.85478 | 24.80 | 0.61232 |
| 23 | −54.8930 | 1.3101 | 1.85151 | 40.73 | 0.56930 |
| 24 | 48.6857 | 1.6811 | | | |
| 25 | −94.4427 | 1.2000 | 1.88300 | 39.22 | 0.57295 |
| 26 | 103.8894 | 3.2002 | | | |
| 27 | 30.6231 | 3.6153 | 1.51818 | 58.95 | 0.54577 |
| 28 | 1475.1432 | 10.2497 | | | |
| 29 | −589.8714 | 1.5802 | 1.95906 | 17.47 | 0.65993 |
| 30 | 88.8660 | 2.8590 | 1.51742 | 52.19 | 0.55915 |
| 31 | −93.2941 | 8.5150 | | | |
| 32 | 86.6636 | 4.1350 | 1.73800 | 32.33 | 0.59005 |
| 33 | −51.2321 | 0.7866 | | | |
| 34 | −33.7508 | 1.5998 | 1.59282 | 68.62 | 0.54414 |
| 35 | 37.1900 | 2.3565 | | | |
| 36 | 37.9873 | 7.6880 | 1.73800 | 32.33 | 0.59005 |
| 37 | −29.7000 | 1.5501 | 1.90070 | 37.05 | 0.57796 |
| 38 | −1523.3258 | 45.7964 | | | |
| 39 | ∞ | 2.8500 | 1.51680 | 64.20 | 0.53430 |
| 40 | ∞ | 0.0000 | | | |

TABLE 6

Example 2 Specification

| | Infinity | Closest |
|---|---|---|
| f | 388.23 | — |
| fnear | — | 293.97 |
| FNo. | 4.12 | 4.53 |
| 2ω(°) | 4.2 | 3.8 |

TABLE 7

Example 2 Variable Surface Distance

| | Infinity | Closest |
|---|---|---|
| DD[17] | 15.19 | 6.19 |
| DD[19] | 9.11 | 18.11 |

TABLE 8

Example 2 Phase Difference Coefficient Tenth Surface

| | |
|---|---|
| A2 | −6.43816E−01 |
| A4 | 2.59179E−04 |
| A6 | −1.30426E−07 |
| A8 | 9.59064E−11 |
| A10 | −2.85686E−14 |

EXAMPLE 3

Figure 3:
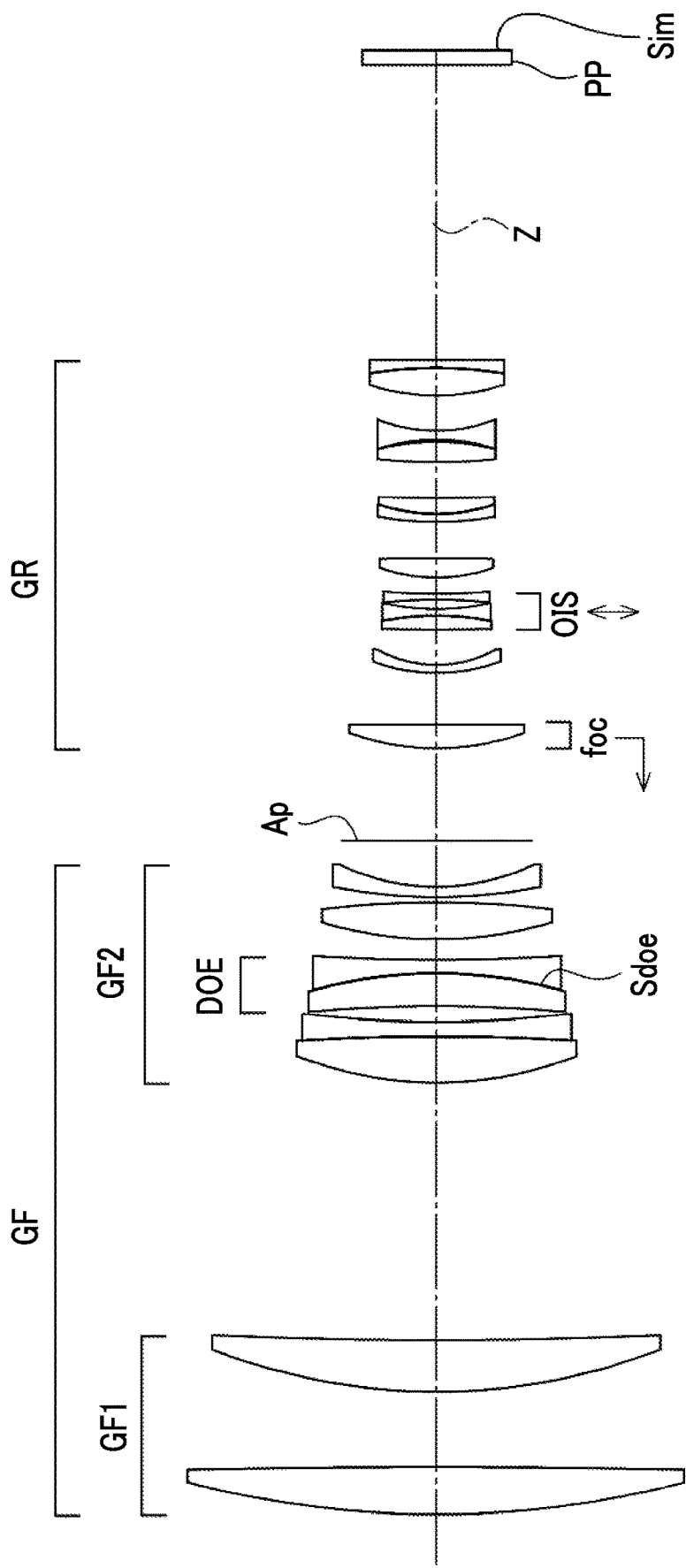
FIG. 3 is a cross-sectional view showing a configuration and rays of the imaging lens according to Example 3 of the present disclosure.
Figure 8:
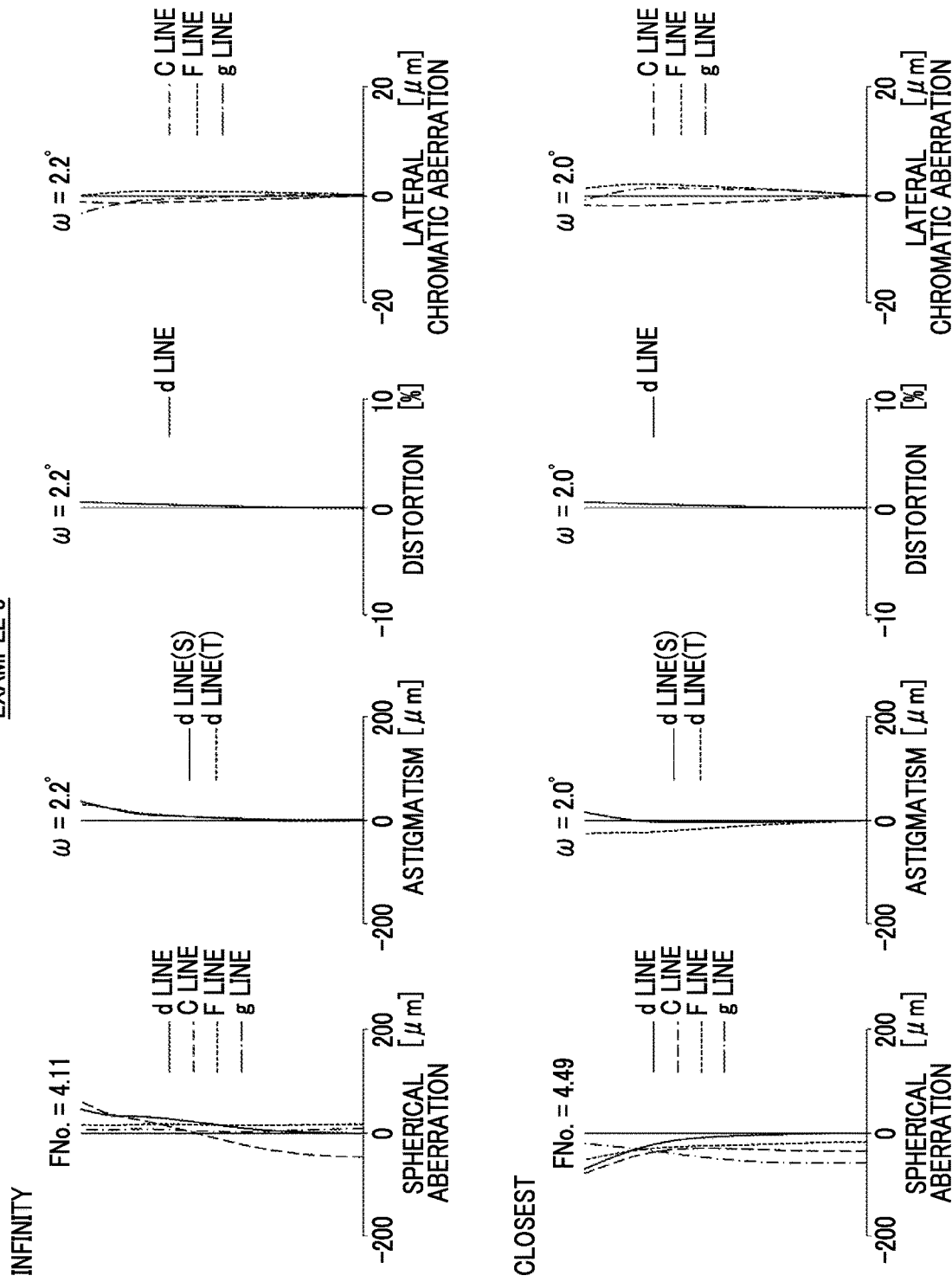
FIG. 8 is a diagram of aberrations of the imaging lens of Example 3 of the present disclosure.

FIG. 3 is a cross-sectional view showing a configuration of the imaging lens of Example 3. The imaging lens of Example 3 has the same configuration as the outline of the imaging lens of Example 1. Regarding the imaging lens of Example 3, Table 9 shows basic lens data thereof, Table 10 shows data about specification thereof, Table 11 shows variable surface distances thereof, Table 12 shows phase difference coefficients thereof, and FIG. 8 shows aberration diagrams. In FIG. 8, the upper part shows aberration diagrams in a state in which the object at infinity is in focus, and the lower part shows aberration diagrams in a state in which the closest object is in focus. The object distance of the closest object in the data of the imaging lens of Example 3 is 2914.8 mm (millimeter).

TABLE 9

Example 3 Basic Lens Data

| Sn | R | D | Nd | vd | θgF |
|---|---|---|---|---|---|
| 1 | 203.3802 | 9.1964 | 1.53172 | 48.84 | 0.56558 |
| 2 | −2402.0524 | 14.7437 | | | |
| 3 | 126.1859 | 10.0880 | 1.43700 | 95.10 | 0.53364 |
| 4 | 1010.4055 | 49.9805 | | | |
| 5 | 77.9208 | 9.0602 | 1.43700 | 95.10 | 0.53364 |
| 6 | −440.2104 | 2.7198 | 1.80450 | 39.64 | 0.57146 |
| 7 | 211.1920 | 3.0718 | | | |
| 8 | −303.4195 | 6.3873 | 1.48749 | 70.44 | 0.53062 |
| 9 | −94.8179 | 0.0010 | 1.53458 | 18.91 | 0.38608 |
| 10(Sdoe) | −94.8179 | 0.0590 | 1.59952 | 45.78 | 0.54376 |
| 11 | −94.8179 | 2.6998 | 1.72000 | 50.34 | 0.55026 |
| 12 | 424.4271 | 3.9405 | | | |
| 13 | 83.0677 | 7.2370 | 1.49700 | 81.61 | 0.53887 |
| 14 | −197.2604 | 0.9998 | | | |
| 15 | 108.6849 | 1.9508 | 1.91082 | 35.25 | 0.58224 |
| 16 | 44.6885 | 9.0656 | | | |
| 17(Ap) | ∞ | DD[17] | | | |
| 18 | 53.1098 | 4.6094 | 1.57501 | 41.51 | 0.57711 |
| 19 | ∞ | DD[19] | | | |
| 20 | 39.0842 | 1.4998 | 1.51742 | 52.19 | 0.55915 |
| 21 | 24.9435 | 6.9183 | | | |
| 22 | 389.3822 | 2.7338 | 1.85478 | 24.80 | 0.61232 |
| 23 | −57.4010 | 1.3102 | 1.85151 | 40.73 | 0.56930 |
| 24 | 51.4250 | 1.7672 | | | |
| 25 | −103.4084 | 1.2002 | 1.88300 | 39.22 | 0.57295 |
| 26 | 120.2974 | 3.2001 | | | |
| 27 | 35.4055 | 3.7266 | 1.48749 | 70.44 | 0.53062 |
| 28 | −794.7042 | 7.0006 | | | |
| 29 | 67.3741 | 1.5800 | 1.95906 | 17.47 | 0.65993 |
| 30 | 38.0154 | 3.0560 | 1.56883 | 56.06 | 0.54990 |
| 31 | 226.7253 | 7.0329 | | | |
| 32 | 114.2993 | 4.0376 | 1.73800 | 32.33 | 0.59005 |
| 33 | −48.7738 | 0.4413 | | | |
| 34 | −38.1249 | 1.7148 | 1.59282 | 68.62 | 0.54414 |
| 35 | 33.4601 | 6.7151 | | | |
| 36 | 45.4932 | 5.3010 | 1.73800 | 32.33 | 0.59005 |
| 37 | −87.7266 | 1.5499 | 1.80451 | 39.64 | 0.57313 |
| 38 | 3480.6913 | 57.6108 | | | |
| 39 | ∞ | 2.8500 | 1.51680 | 64.20 | 0.53430 |
| 40 | ∞ | 0.0000 | | | |

TABLE 10

Example 3 Specification

| | Infinity | Closest |
|---|---|---|
| f | 388.25 | — |
| fnear | — | 312.52 |
| FNo. | 4.11 | 4.49 |
| 2ω(°) | 4.4 | 4.0 |

TABLE 11

Example 3 Variable Surface Distance

| | Infinity | Closest |
|---|---|---|
| DD[17] | 17.97 | 8.91 |
| DD[19] | 10.18 | 19.24 |

TABLE 12

Example 3 Phase Difference Coefficient Tenth Surface

| | |
|---|---|
| A2 | −5.80238E−01 |
| A4 | 2.22760E−04 |
| A6 | −9.44345E−08 |
| A8 | 7.70036E−12 |
| A10 | 3.03507E−14 |

EXAMPLE 4

Figure 4:
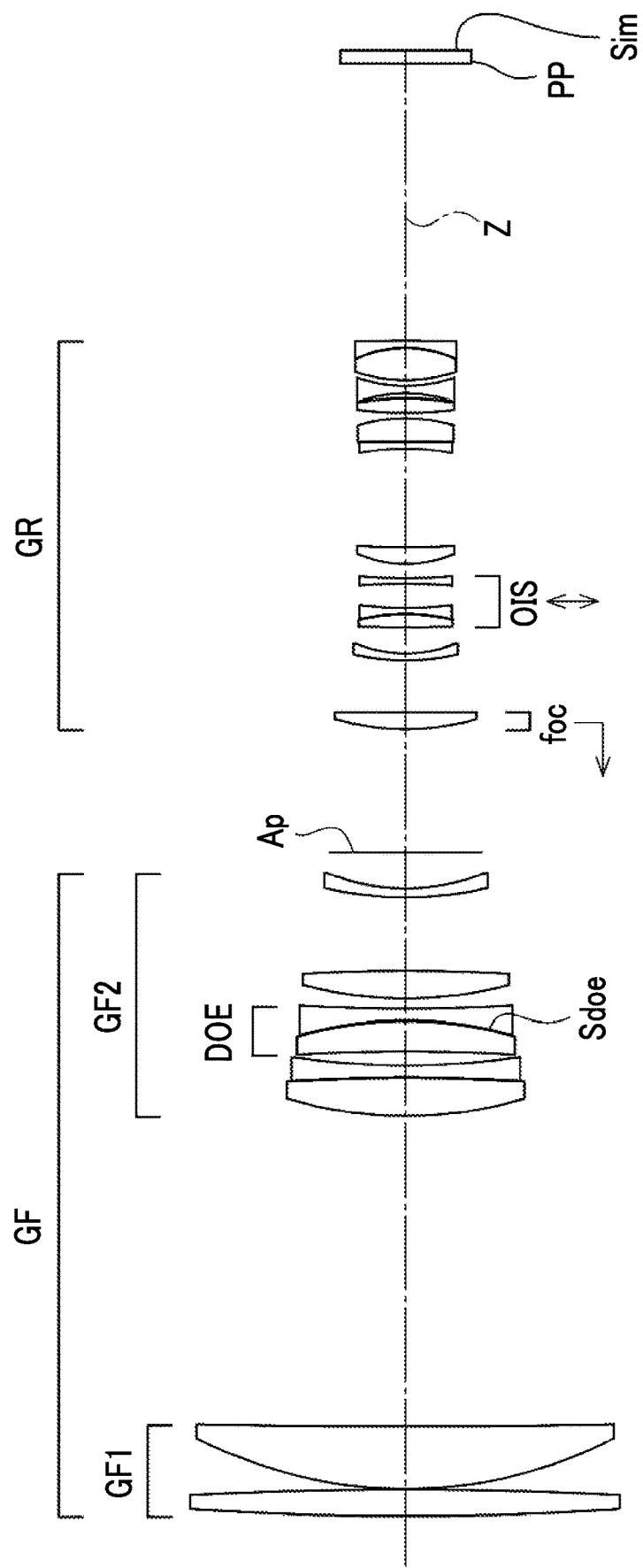
FIG. 4 is a cross-sectional view showing a configuration and rays of the imaging lens according to Example 4 of the present disclosure.
Figure 9:
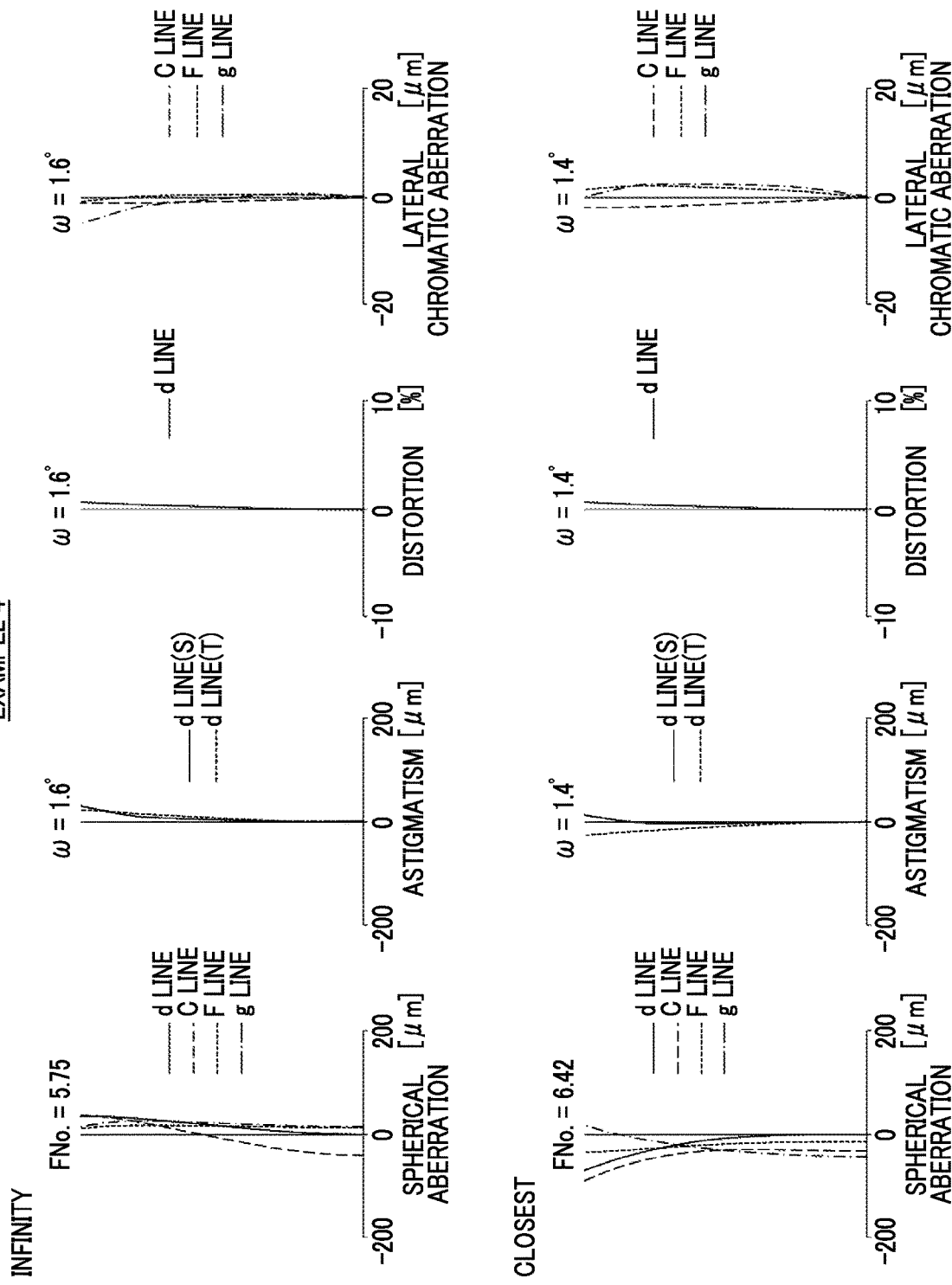
FIG. 9 is a diagram of aberrations of the imaging lens of Example 4 of the present disclosure.

FIG. 4 is a cross-sectional view showing a configuration of the imaging lens of Example 4. The imaging lens of Example 4 has the same configuration as the outline of the imaging lens of Example 1. Regarding the imaging lens of Example 4, Table 13 shows basic lens data thereof, Table 14 shows data about specification thereof, Table 15 shows variable surface distances thereof, Table 16 shows phase difference coefficients thereof, and FIG. 9 shows aberration diagrams. In FIG. 9, the upper part shows aberration diagrams in a state in which the object at infinity is in focus, and the lower part shows aberration diagrams in a state in which the closest object is in focus. The object distance of the closest object in the data of the imaging lens of Example 4 is 2874.8 mm (millimeter).

TABLE 13

Example 4 Basic Lens Data

| Sn | R | D | Nd | vd | θgF |
|---|---|---|---|---|---|
| 1 | 780.2125 | 5.7999 | 1.54072 | 47.20 | 0.56784 |
| 2 | −959.3501 | 0.1998 | | | |
| 3 | 106.2045 | 13.9154 | 1.43700 | 95.10 | 0.53364 |
| 4 | 2401.0001 | 68.7391 | | | |
| 5 | 95.9529 | 8.4849 | 1.43700 | 95.10 | 0.53364 |
| 6 | −440.0784 | 2.7200 | 1.83481 | 42.73 | 0.56459 |
| 7 | 168.2673 | 3.1586 | | | |
| 8 | −439.7566 | 6.6659 | 1.48749 | 70.44 | 0.53062 |
| 9 | −92.6538 | 0.0010 | 1.53458 | 18.91 | 0.38608 |
| 10(Sdoe) | −92.6538 | 0.0590 | 1.59952 | 45.78 | 0.54376 |
| 11 | −92.6538 | 2.6999 | 1.78590 | 44.21 | 0.56289 |
| 12 | 397.4728 | 2.2723 | | | |
| 13 | 95.1731 | 6.0913 | 1.49700 | 81.61 | 0.53887 |
| 14 | −386.3030 | 16.3708 | | | |
| 15 | 83.3871 | 1.9500 | 1.74400 | 44.90 | 0.56624 |
| 16 | 47.2997 | 8.0627 | | | |
| 17(Ap) | ∞ | DD[17] | | | |

TABLE 13-continued

Example 4 Basic Lens Data

| Sn | R | D | Nd | νd | θgF |
|---|---|---|---|---|---|
| 18 | 60.7085 | 3.7204 | 1.54072 | 47.20 | 0.56784 |
| 19 | ∞ | DD[19] | | | |
| 20 | 54.2457 | 1.5066 | 1.48749 | 70.44 | 0.53062 |
| 21 | 30.4473 | 5.9479 | | | |
| 22 | 520.3245 | 2.8699 | 1.85478 | 24.80 | 0.61232 |
| 23 | −46.4571 | 1.3100 | 1.85151 | 40.73 | 0.56930 |
| 24 | 84.3736 | 5.4645 | | | |
| 25 | −154.6838 | 1.1998 | 1.88300 | 40.80 | 0.56557 |
| 26 | 114.3839 | 3.1998 | | | |
| 27 | 29.1268 | 3.6391 | 1.51818 | 58.95 | 0.54577 |
| 28 | 182.0074 | 21.8731 | | | |
| 29 | −55.8744 | 1.5798 | 1.95906 | 17.47 | 0.65993 |
| 30 | −435.0195 | 5.1319 | 1.54072 | 47.20 | 0.56784 |
| 31 | −41.1147 | 1.2000 | | | |
| 32 | 97.8572 | 3.2202 | 1.73800 | 32.33 | 0.59005 |
| 33 | −70.4318 | 1.0712 | | | |
| 34 | −33.3852 | 1.6002 | 1.59282 | 68.62 | 0.54414 |
| 35 | 36.3556 | 1.2138 | | | |
| 36 | 36.6703 | 7.2536 | 1.73800 | 32.33 | 0.59005 |
| 37 | −26.6361 | 1.5498 | 1.91082 | 35.25 | 0.58224 |
| 38 | −393.0502 | 61.6374 | | | |
| 39 | ∞ | 2.8500 | 1.51680 | 64.20 | 0.53430 |
| 40 | ∞ | 0.0000 | | | |

TABLE 14

Example 4 Specification

| | Infinity | Closest |
|---|---|---|
| f | 543.85 | — |
| fnear | — | 342.80 |
| FNo. | 5.75 | 6.42 |
| 2ω(°) | 3.2 | 2.8 |

TABLE 15

Example 4 Variable Surface Distance

| | Infinity | Closest |
|---|---|---|
| DD[17] | 27.42 | 11.54 |
| DD[19] | 11.51 | 27.39 |

TABLE 16

Example 4 Phase Difference Coefficient Tenth Surface

| A2 | −3.60026E−01 |
| A4 | 8.91841E−05 |
| A6 | −5.28189E−08 |
| A8 | 1.53296E−11 |
| A10 | −5.83292E−15 |

EXAMPLE 5

Figure 5:
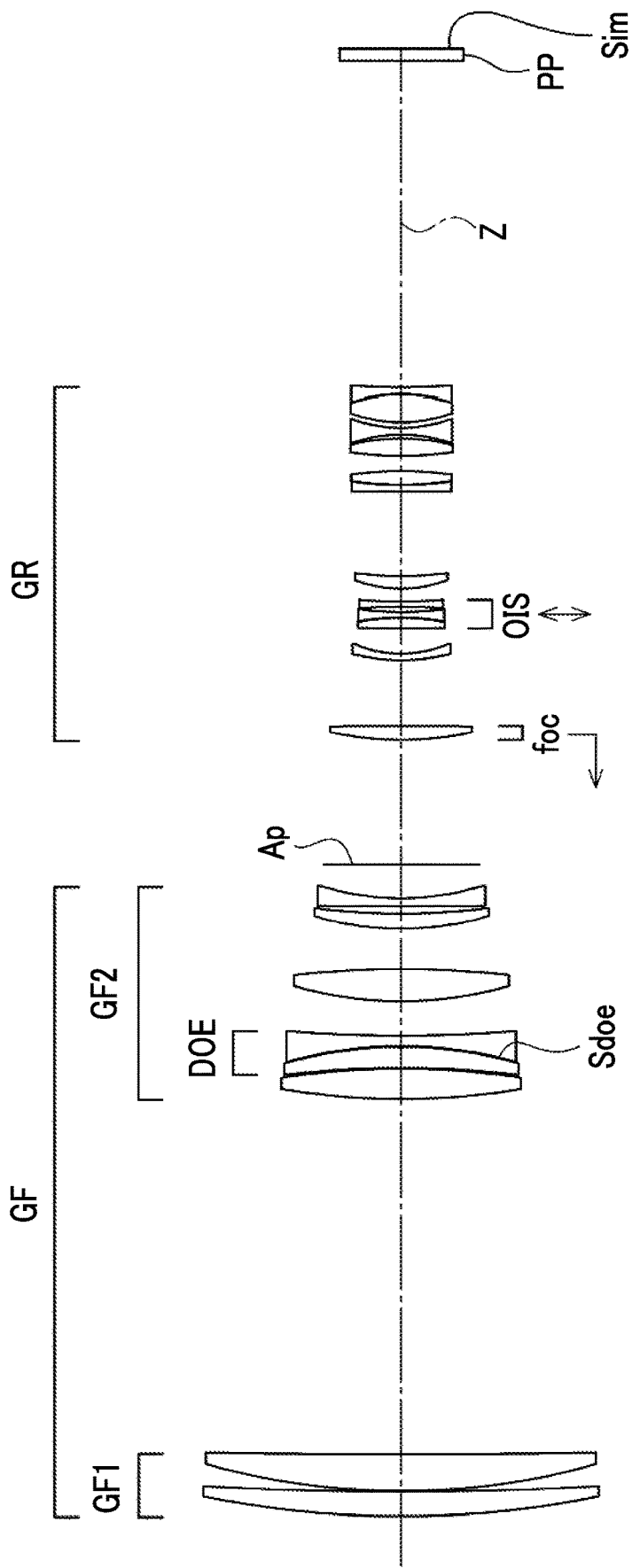
FIG. 5 is a cross-sectional view showing a configuration and rays of the imaging lens according to Example 5 of the present disclosure.
Figure 10:
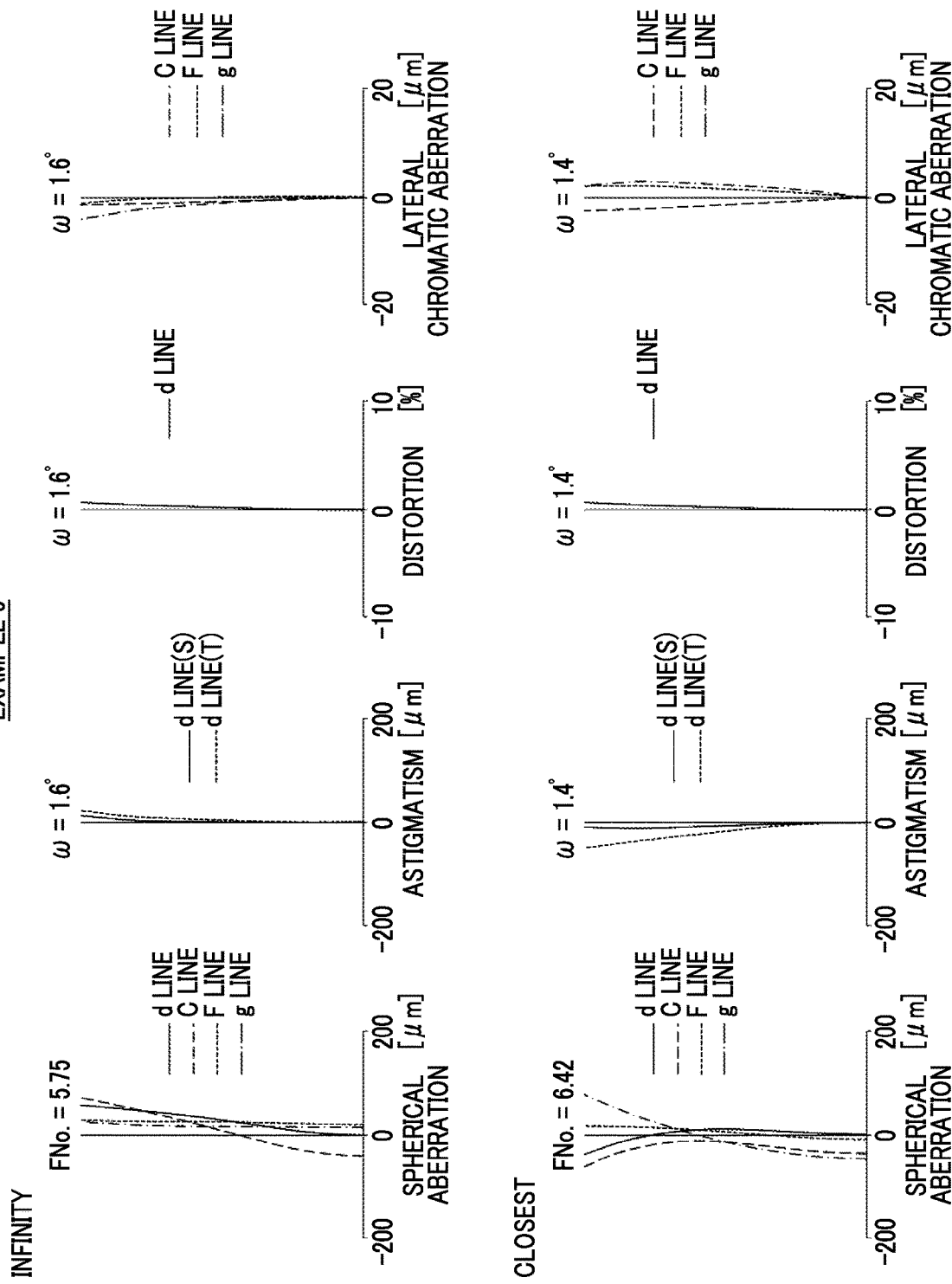
FIG. 10 is a diagram of aberrations of the imaging lens of Example 5 of the present disclosure.

FIG. 5 is a cross-sectional view showing a configuration of the imaging lens of Example 5. The imaging lens of Example 5 has the same configuration as that of the imaging lens of Example 1 except that the cemented lens closest to the object side corresponds to the diffractive optical element DOE. Regarding the imaging lens of Example 5, Table 17 shows basic lens data thereof, Table 18 shows data about specification thereof, Table 19 shows variable surface distances thereof, Table 20 shows phase difference coefficients thereof, and FIG. 10 shows aberration diagrams. In FIG. 10, the upper part shows aberration diagrams in a state in which the object at infinity is in focus, and the lower part shows aberration diagrams in a state in which the closest object is in focus. The object distance of the closest object in the data of the imaging lens of Example 5 is 2849.7 mm (millimeter).

TABLE 17

Example 5 Basic Lens Data

| Sn | R | D | Nd | νd | θgF |
|---|---|---|---|---|---|
| 1 | 256.9306 | 5.7999 | 1.56732 | 42.84 | 0.57436 |
| 2 | 868.7794 | 0.2001 | | | |
| 3 | 181.1543 | 8.7479 | 1.48749 | 70.44 | 0.53062 |
| 4 | 3012.6843 | 84.7831 | | | |
| 5 | 182.5166 | 7.2219 | 1.41390 | 100.82 | 0.53373 |
| 6 | −197.3682 | 0.1500 | | | |
| 7 | −246.9975 | 5.1723 | 1.54814 | 45.82 | 0.57004 |
| 8 | −106.3846 | 0.0040 | 1.53458 | 18.91 | 0.38608 |
| 9(Sdoe) | −106.3846 | 0.0900 | 1.59952 | 45.78 | 0.54376 |
| 10 | −106.3846 | 2.5001 | 1.87070 | 40.73 | 0.56825 |
| 11 | 368.3263 | 8.1237 | | | |
| 12 | 97.7459 | 7.7116 | 1.48749 | 70.44 | 0.53062 |
| 13 | −228.7179 | 9.6891 | | | |
| 14 | 78.6577 | 3.6382 | 1.49700 | 81.61 | 0.53887 |
| 15 | 176.5832 | 1.6780 | | | |
| 16 | 2041.9711 | 1.9500 | 1.91082 | 35.25 | 0.58224 |
| 17 | 67.1927 | 8.1167 | | | |
| 18(Ap) | ∞ | DD[18] | | | |
| 19 | 81.7925 | 3.4193 | 1.61293 | 36.96 | 0.58507 |
| 20 | −1257.6233 | DD[20] | | | |
| 21 | 49.0966 | 1.4998 | 1.51742 | 52.43 | 0.55649 |
| 22 | 28.9638 | 6.0790 | | | |
| 23 | 355.1742 | 2.6195 | 1.85478 | 24.80 | 0.61232 |
| 24 | −56.8366 | 1.3098 | 1.85150 | 40.78 | 0.56958 |
| 25 | 76.7025 | 1.2812 | | | |
| 26 | −133.1300 | 1.2000 | 1.90070 | 37.05 | 0.57796 |
| 27 | 132.7559 | 3.2000 | | | |
| 28 | 32.9820 | 3.0000 | 1.48749 | 70.44 | 0.53062 |
| 29 | 95.4720 | 20.1024 | | | |
| 30 | −3540.3904 | 1.5798 | 1.95906 | 17.47 | 0.65993 |
| 31 | 84.6979 | 3.3208 | 1.54814 | 45.82 | 0.57004 |
| 32 | −86.9338 | 3.5773 | | | |
| 33 | 94.3050 | 4.2449 | 1.68376 | 37.64 | 0.57823 |
| 34 | −53.5111 | 0.9148 | | | |
| 35 | −38.2085 | 1.5998 | 1.53775 | 74.70 | 0.53936 |
| 36 | 36.4319 | 1.3134 | | | |
| 37 | 38.3437 | 6.6635 | 1.73800 | 32.33 | 0.59005 |
| 38 | −37.7631 | 1.5498 | 1.87070 | 40.73 | 0.56825 |
| 39 | 191.9593 | 78.0565 | | | |
| 40 | ∞ | 2.8500 | 1.51680 | 64.20 | 0.53430 |
| 41 | ∞ | 0.0000 | | | |

TABLE 18

Example 5 Specification

| | Infinity | Closest |
|---|---|---|
| f | 546.86 | — |
| fnear | — | 360.79 |
| FNo. | 5.75 | 6.42 |
| 2ω(°) | 3.2 | 2.8 |

TABLE 19

Example 5 Variable Surface Distance

| | Infinity | Closest |
|---|---|---|
| DD[18] | 29.69 | 13.53 |
| DD[20] | 15.69 | 31.84 |

TABLE 20

| Example 5 Phase Difference Coefficient Tenth Surface | |
|---|---|
| A2 | −4.99065E−01 |
| A4 | 6.41899E−05 |
| A6 | −2.32522E−08 |
| A8 | 8.64387E−12 |
| A10 | −1.89403E−15 |

Table 21 shows values corresponding to Conditional Expressions (1) to (4) of the imaging lenses of Examples 1 to 5.

TABLE 21

| | Surface Number | Example 1 | Example 2 | Example 3 | Example 4 | Example 5 |
|---|---|---|---|---|---|---|
| (1) | Ddoe/f | 0.065 | 0.068 | 0.067 | 0.069 | 0.080 |
| (2) | vp | 45.82 | 52.15 | 48.84 | 47.20 | 42.84 |
| (3) | (Rp1 + Rp2)/(Rp1 − Rp2) | 1.00 | 1.64 | 1.91 | 1.53 | 2.51 |
| (4) | θgF2 − θgF1 | 0.15768 | 0.15768 | 0.15768 | 0.15768 | 0.15768 |

As can be seen from the above data, the imaging lenses of Examples 1 to 5 are reduced in size and weight, various aberrations including chromatic aberration and spherical aberration are satisfactorily corrected, and high optical performance is achieved.

Figure 13:
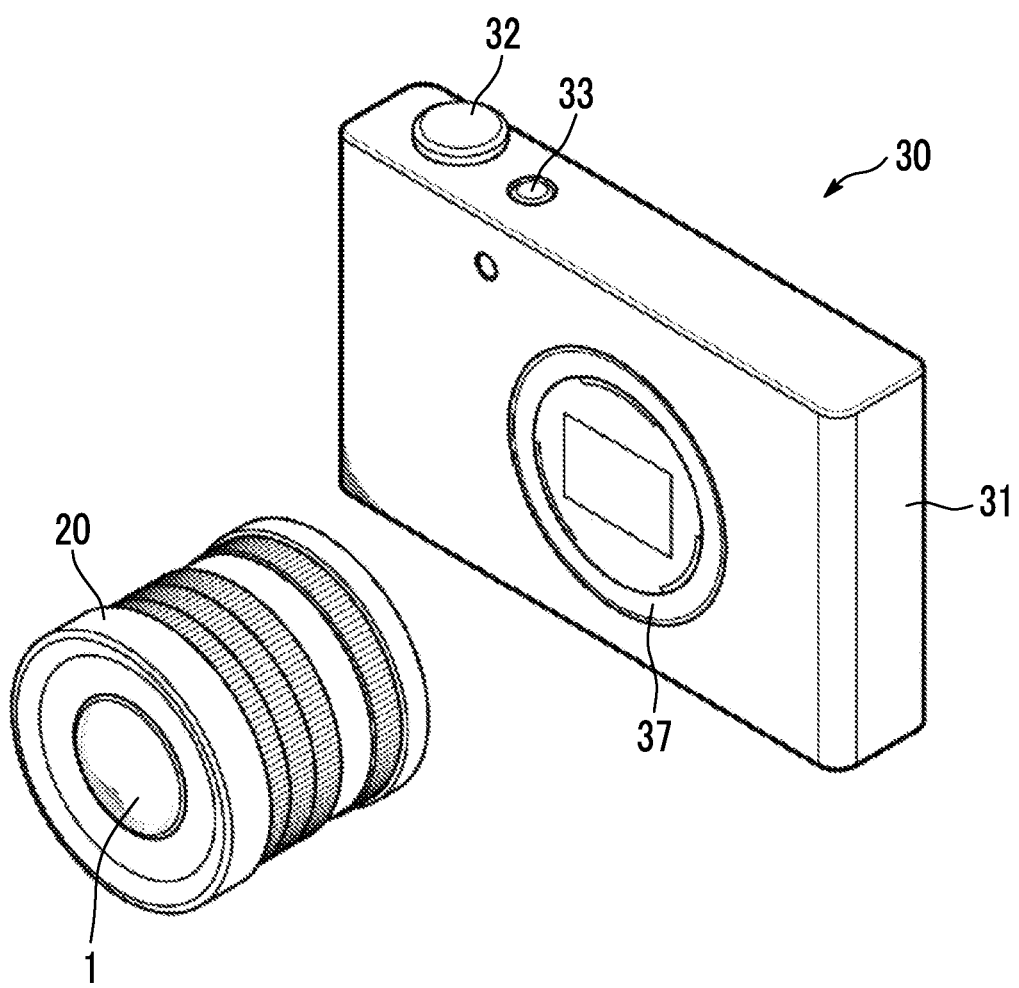
FIG. 13 is a perspective view of the front side of an imaging apparatus according to an embodiment of the present disclosure.
Figure 14:
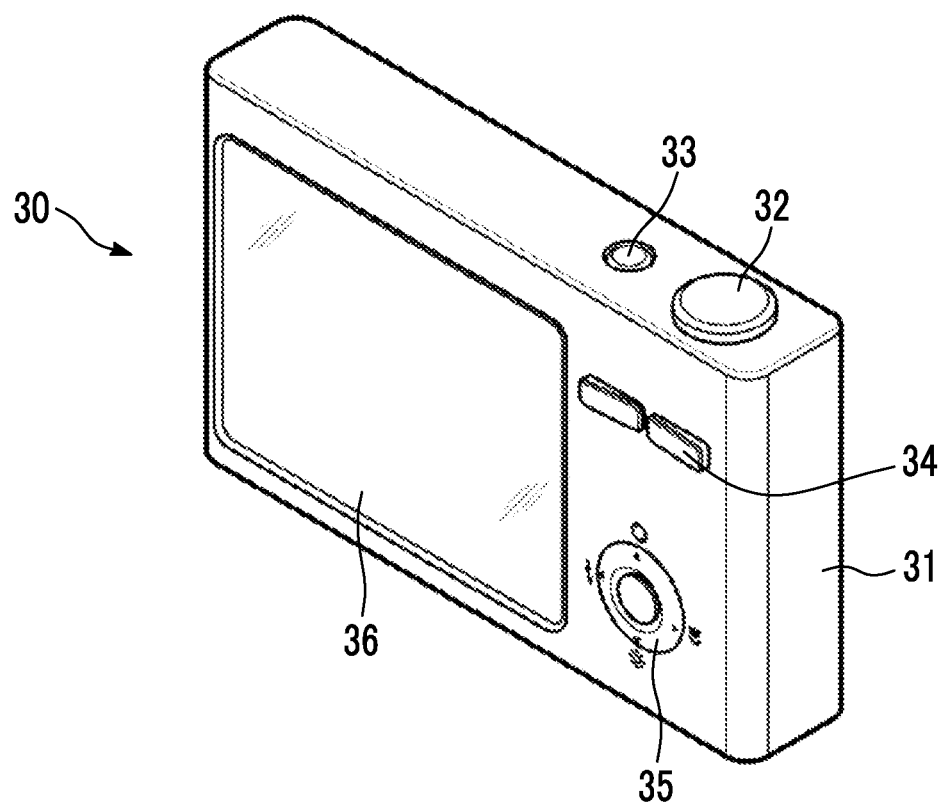
FIG. 14 is a perspective view of the rear side of an imaging apparatus according to an embodiment of the present disclosure.

Next, an imaging apparatus according to an embodiment of the present disclosure will be described. FIGS. 13 and 14 are external views of a camera 30 which is the imaging apparatus according to the embodiment of the present disclosure. FIG. 13 is a perspective view of the camera 30 viewed from the front side, and FIG. 14 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the phase difference coefficient of each lens are not limited to the values shown in the numerical examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side:
    a front group;
    an aperture stop; and
    a rear group,
    wherein the front group includes a diffractive optical element having a positive lens and a negative lens in order from the object side,
    wherein a diffractive surface is provided between an object side surface of the positive lens and an image side surface of the negative lens, and
    wherein assuming that
        a distance on an optical axis from the diffractive surface to the aperture stop in a state in which an object at infinity is in focus is Ddoe, and
        a focal length of the imaging lens in a state in which the object at infinity is in focus is f,
        Conditional Expression (1) is satisfied, which is represented by $$0.02 < Ddoe/f < 0.11 \quad (1),$$

wherein assuming that
        a radius of curvature of the object side surface of the positive lens closest to the object side in the diffractive optical element is Rp1, and
        a radius of curvature of an image side surface of the positive lens closest to the object side in the diffractive optical element is Rp2,
        Conditional Expression (3) is satisfied, which is represented by $$0.7 < (Rp1+Rp2)/(Rp1-Rp2) < 5 \quad (3).$$

2. The imaging lens according to claim 1,
    wherein the front group includes at least one positive lens closer to the object side than the diffractive optical element, and
    wherein assuming that an Abbe number of the at least one positive lens based on a d line is vp, the imaging lens includes at least one positive lens that is closer to the object side than the diffractive optical element and satisfies Conditional Expression (2), which is represented by $$20<vp<65 \qquad (2).$$

3. The imaging lens according to claim 1,
wherein the front group has a positive refractive power, and
wherein the rear group includes a focusing lens group which moves along the optical axis during focusing and has a positive refractive power.

4. The imaging lens according to claim 3, wherein the focusing lens group consists of one positive lens.

5. The imaging lens according to claim 3, wherein the rear group includes a vibration reduction lens group which moves in a direction that intersects with the optical axis during image blur correction, at a position closer to an image side than the focusing lens group.

6. The imaging lens according to claim 1,
wherein the front group consists of, in order from the object side, a first partial group and a second partial group which is separated from the first partial group by a longest air distance on the optical axis in the front group, and
wherein the diffractive optical element is disposed in the second partial group.

7. An imaging lens consisting of, in order from an object side:
a front group;
an aperture stop; and
a rear group,
wherein the front group includes a diffractive optical element having a positive lens and a negative lens in order from the object side,
wherein a diffractive surface is provided between an object side surface of the positive lens and an image side surface of the negative lens, and
wherein assuming that
a distance on an optical axis from the diffractive surface to the aperture stop in a state in which an object at infinity is in focus is Ddoe, and
a focal length of the imaging lens in a state in which the object at infinity is in focus is f,
Conditional Expression (1) is satisfied, which is represented by $$0.02<Ddoe/f<0.11 \qquad (1),$$

wherein the front group consists of, in order from the object side, a first partial group and a second partial group which is separated from the first partial group by a longest air distance on the optical axis in the front group,
wherein the diffractive optical element is disposed in the second partial group, and
wherein the first partial group consists of two positive lenses.

8. The imaging lens according to claim 1, wherein an Abbe number of the positive lens closest to the object side in the diffractive optical element based on a d line is greater than an Abbe number of the negative lens closest to an image side in the diffractive optical element based on the d line.

9. The imaging lens according to claim 1,
wherein the diffractive optical element has, in order from the object side, a first resin member and a second resin member, which is cemented with the first resin member and of which a refractive index is different from that of the first resin member, between the positive lens and the negative lens arranged in order from the object side,
wherein the diffractive surface is provided on a cemented surface between the first resin member and the second resin member, and
wherein assuming that
a partial dispersion ratio of the first resin member between a g line and an F line is θgF1, and
a partial dispersion ratio of the second resin member between the g line and the F line is θgF2,
Conditional Expression (4) is satisfied, which is represented by $$0.08<\theta gF2-\theta gF1<0.3 \qquad (4).$$

10. The imaging lens according to claim 1, wherein Conditional Expression (1-1) is satisfied, which is represented by $$05<Ddoe/f<0.09 \qquad (1\text{-}1).$$

11. The imaging lens according to claim 2, wherein at least one positive lens is provided closer to the object side than the diffractive optical element, and satisfies Conditional Expression (2-1), which is represented by $$40<vp<55 \qquad (2\text{-}1).$$

12. The imaging lens according to claim 1, wherein Conditional Expression (3-1) is satisfied, which is represented by $$9<(Rp1+Rp2)/(Rp1-Rp2)<3 \qquad (3\text{-}1).$$

13. The imaging lens according to claim 9, wherein Conditional Expression (4-1) is satisfied, which is represented by $$13<\theta gF2-\theta gF1<0.2 \qquad (4\text{-}1).$$

14. An imaging apparatus comprising the imaging lens according to claim 1.

15. An imaging lens consisting of, in order from an object side:
a front group;
an aperture stop; and
a rear group,
wherein the front group includes a diffractive optical element having a positive lens and a negative lens in order from the object side,
wherein a diffractive surface is provided between an object side surface of the positive lens and an image side surface of the negative lens,
wherein assuming that
a distance on an optical axis from the diffractive surface to the aperture stop in a state in which an object at infinity is in focus is Ddoe, and
a focal length of the imaging lens in a state in which the object at infinity is in focus is f,
Conditional Expression (1) is satisfied, which is represented by $$0.02<Ddoe/f<0.11 \qquad (1), \text{ and}$$

wherein the imaging lens includes only one aperture stop.

* * * * *